United States Patent [19]

Koerbel et al.

[11] 4,015,871

[45] Apr. 5, 1977

[54] DOOR VALET

[75] Inventors: Claus E. Koerbel, Warren; Kenneth M. McIntyre, Grosse Pointe Woods, both of Mich.

[73] Assignee: Lunar Industries, Inc., Fraser, Mich.

[22] Filed: Aug. 13, 1975

[21] Appl. No.: 604,188

[52] U.S. Cl. ................................ 294/19 R; 81/3 R

[51] Int. Cl.[2] ....................... A47F 13/06; B25J 1/00

[58] Field of Search ............. 294/1 R, 15, 19 R, 26; 81/3 R; 254/21, 25, 131

[56] References Cited

UNITED STATES PATENTS

| | | | |
|---|---|---|---|
| 154,926 | 9/1874 | Stimson | 254/25 |
| 2,687,540 | 8/1954 | Noll | 254/21 X |
| 2,907,237 | 10/1959 | Casas | 81/3 R |
| 3,760,656 | 9/1973 | Veach | 294/19 R UX |
| 3,764,175 | 10/1973 | Yavitch | 294/19 R |
| 3,819,221 | 6/1974 | O'Connor | 294/19 R |
| D30,111 | 1/1899 | Thomson | 254/25 X |

*Primary Examiner*—Johnny D. Cherry

[57] ABSTRACT

A door valet utilized by the driver of a motor vehicle to unlock vehicle doors by raising the door lock button while the driver is seated in a driving position. The door valet includes a long handle, to be held at one end by the driver, and has a lock-button engaging portion at the opposite end. The lock-button engaging portion includes a pair of transversely spaced apart cam surfaces inclined toward the distal end of the door valet and separated by a slot with the slot being wide enough to accommodate the door lock button stem but not wide enough to accommodate the enlarged head of the door lock button. Upon horizontal movement of the apparatus by the driver toward the door lock button, the cam surfaces elevate the door lock button to an unlocked position and the slot accommodates vertical movement of the door lock button stem.

2 Claims, 3 Drawing Figures

DOOR VALET

BACKGROUND OF INVENTION

This invention relates to a method and apparatus for utilization by the driver of a motor vehicle to unlock the vehicle doors without moving from the normal driving position, i.e., without moving from behind the steering wheel. More particularly, the present invention relates to a hand-held apparatus for enabling the driver of a motor vehicle to reach each of the various door locks of a conventional automobile.

Heretofore, when the driver of a motor vehicle wished to unlock the various doors, other than the driver's door, it was necessary to stretch and lean toward each door lock button while attempting to maintain one foot on the brake pedal to prevent the motor vehicle from moving. Alternatively, the vehicle could be immobilized by putting the transmission into park prior to the driver stretching to reach the various door lock buttons.

In each instance, after the driver had immobilized the car, it was then necessary for the driver to reach across the front seat to unlock the opposite front door and to reach over the front seat into the rear portion of the passenger compartment to unlock the rear doors. However, the extensive use of head rests to minimize whiplash injury, now mandatory by federal safety regulations, makes it extremely cumbersome for the driver of a vehicle to reach over the front seat into the rear portion of the passenger compartment to unlock the rear doors.

Furthermore, once the driver of the vehicle reaches the door lock buttons, it is necessary to elevate each button. However, as the driver is stretching to reach the various doors, this type of vertical movement of the door lock button is both difficult and uncomfortable.

Hence, the present invention overcomes these disadvantages by providing an apparatus to be utilized by the driver of a motor vehicle to easily reach and unlock the door lock buttons.

SUMMARY OF THE INVENTION

The present invention overcomes the aforementioned disadvantages by providing a door valet apparatus for utilization by the driver of a motor vehicle to unlock the vehicle doors by raising the door lock buttons while the driver remains in a driving position.

It is an object of the present invention to provide an apparatus for utilization by the driver of a motor vehicle to unlock vehicle doors, comprising an elongated handle to be held at a first end by the driver and having a lock-button engaging portion at the opposite end of the handle with the lock-engaging portion including a pair of transversely spaced cam surfaces separated by a slot which extends longitudinally of the handle. The cam surfaces are inclined toward the base and distal end of the apparatus. The slot is of a width sufficient to receive the stem of a conventional door lock button but insufficiently wide to accommodate the enlarged head of a door lock button. Upon unidirectional horizontal movement of the door valet apparatus by the driver toward the door lock button, the cam surfaces elevate the door lock button to an unlocked position and the slot accommodates vertical movement of the stem of the door lock button.

It is another object of the present invention to provide an improved method of elevating a conventional door lock button by positioning a lock-button engaging apparatus adjacent the button, the apparatus including a pair of transversely spaced apart cam surfaces separated by a longitudinal slot, advancing the apparatus horizontally in a linear direction to engage the lock button stem in the slot and to engage the cam surfaces under the enlarged head, and further advancing the apparatus horizontally in the same linear direction toward said button so that the cam surfaces translate the horizontal advancement into vertical movement to elevate the button to an unlocked position with the slot accommodating vertical movement of the stem.

BRIEF DESCRIPTION OF THE DRAWINGS

The various objects of the invention, together with other objects and advantages which may be attained by its use, will become more apparent upon reading the following detailed description of the invention taken in conjunction with the drawings.

In the drawings, wherein like reference numerals identify corresponding components.

AS SHOWN IN THE DRAWINGS

Figure 1:
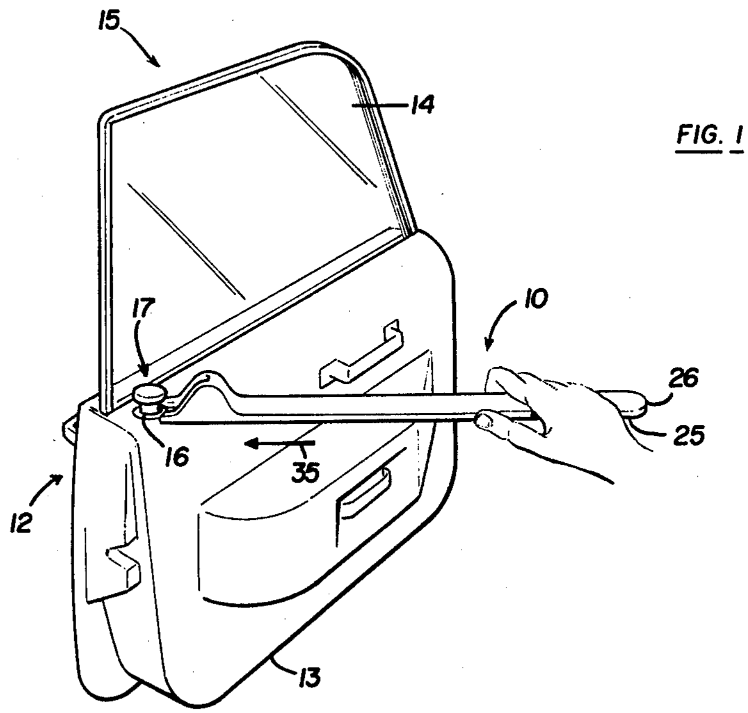
FIG. 1 is a perspective illustration of the door valet apparatus of the present invention being utilized to raise the door lock button of a vehicle door.

The door valet apparatus 10 of the present invention is illustrated as being used to raise the door lock button of the door 12 of a motor vehicle. The door includes a lower body portion 13 and an upper window 14 retractably mounted in the door body. On some vehicles, a frame 15 is provided above the body portion 13 of the door to guide the window 14.

The upper portion of the door body 13 includes an aperture 16 to receive a conventional door lock button 17 which includes a stem 18 of generally circular cross section having a typical diameter of 0.25 to 0.30 inches and an enlarged head 19 at the upper end of the stem. The enlarged head is also circular in cross-section and typically has a diameter of 0.40 inches or more.

The door valet apparatus of the present invention includes an elongated flat handle 25 to be held at or adjacent to a first end 26 by the driver of a motor vehicle. The apparatus includes a lock-button engaging portion 27 at the opposite end of the handle.

The lock-engaging portion 27 of the apparatus includes a pair of transversely spaced inclined or cam surfaces 30 which are preferably curved and parallel. The pair of inclined cam surfaces 30 are separated by a slot 31 which extends longitudinally of the handle. Thus, the two inclined surfaces 30 appear as bifurcated legs separated by and defining the sides of the slot 31.

The slot is of a width sufficient to receive the narrow stem 18 of the door lock button but of insufficient width to accommodate the enlarged head 19 of the door lock button. Thus, the slot has a width of about 0.34 inches. As the apparatus is moved horizontally toward the door lock button 17, such as illustrated by the arrow 35 in FIG. 1, the cam or inclined surfaces 30 elevate the door lock button to an unlocked position by vertically raising the button. The slot 31 accommodates vertical movement of the stem of the door lock button.

Thus, the lock-engaging portion 27 of the apparatus operates as a wedge between the top of the door body 13 and the underside of the enlarged head 19 of the door lock button. Horizontal movement of the lock-engaging portion 27 is translated into vertical movement of the door lock button and this vertical movement is controlled by the contour of the cam surfaces 30.

Figure 2:
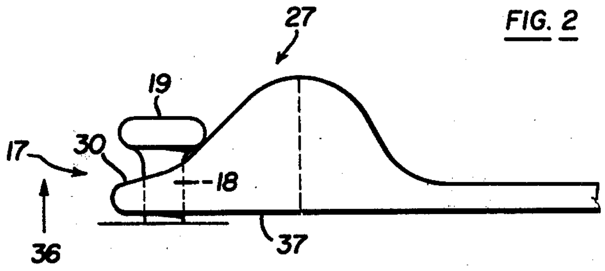
FIG. 2 is a partial front elevation of the door valet apparatus of the present invention; and, FIG. 3 is a top plan view of the apparatus of FIG. 2.
Figure 3:
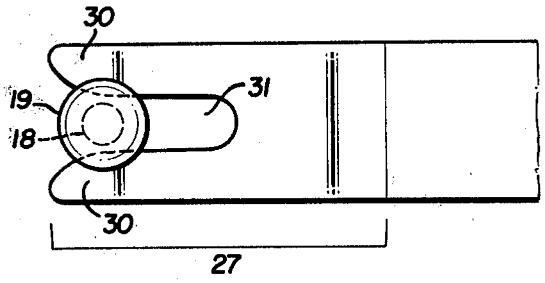

As shown in FIG. 2, the cam surface 30 is essentially one-fourth of a sinusoid and includes a first gently sloping portion at the end of the door valet. That gently sloping portion blends into a more steeply sloping portion of approximately 45°, and the more steeply sloping portion blends back into a more gently sloping portion near the end of the slot 31.

In a preferred embodiment, the cam surfaces 30 are parallel and curved and there are a pair of second external surfaces 37 opposite to the cam surfaces. These second surfaces, as illustrated in the embodiment of FIG. 2, correspond to the bottom or base of the lock-engaging portion 27 and are preferably flat. Thus, the relative distance between the upper or cam surfaces 30 and the lower or second surfaces 37 increase from a smaller distance at the distal end of the door valet apparatus to a larger distance adjacent the distal end and this increase in distance provides the wedging or lifting action to elevate the door lock button.

It must be appreciated, however, that a curved cam surface is not required and that the upper surface may be linear. Similarly, the lower surface 37 need not be flat or linear but may also be curved. The important feature is that the distance between the upper and lower surfaces increases from the end longitudinally inwardly of the handle to provide the necessary elevating or lifting action of the door lock button.

The apparatus of the present invention should be relatively light in weight, strong, rigid rather than flexible to impart the desired lifting action to the door lock button, and sufficiently friction resistant to permit the inclined or cam surfaces to elevate the door lock button. Furthermore, the apparatus should be chip and mar resistant and should not mar the finish on the interior of the vehicle door. For these reasons an integral apparatus injection molded of polystyrene is preferred although aluminum and certain polyethylenes and polyurethanes are also satisfactory.

The foregoing is a complete description of the preferred embodiment of the present invention. It must be appreciated that many changes and modifications may be made without departing from the spirit and scope of the present invention. The invention, therefore, should be limited only by the scope of the following claims.

What is claimed is:

1. Apparatus for utilization by a person in a motor vehicle to unlock the doors of the vehicle by raising a door lock button having a stem of a first diameter and an enlarged head portion at the upper end of the stem, said apparatus comprising a relatively straight elongated handle having a longitudinal axis and substantially flat upper and lower surfaces generally parallel to one another, one end of said handle being adapted to be hand-held by said person and the opposite end including a lock button-engaging portion integral therewith, said lock button engaging portion terminating in a wedge having two spaced apart bifurcated legs separated by a longitudinal slot defining a pair of facing surfaces which are (a) substantially perpendicular to the flat upper and lower surfaces of the handle, (b) substantially parallel to the axis of the handle, and (c) spaced apart a distance of between about 0.25 and about 0.40 inches, the facing surfaces flaring outwardly near the end of the legs to facilitate insertion of the door lock button into the slot, said legs and the longitudinal axis of said slot being substantially parallel to the longitudinal axis of said handle so as to form an integral longitudinal extension thereof, each of said legs having an upper arcuate camming surface inclined toward the distal end thereof and a flat lower surface parallel to and coplanar with the lower surface of said handle, the upper arcuate camming surfaces each being essentially one-fourth of a sinusoid and including a first gently sloping portion at their terminal ends which blends into a more steeply sloping portion of approximately 45° and the more steeply sloping portion blending into a more gently sloping portion near the end of the slot, such that the manual application of a unidirectional, generally horizontal force in the direction of the longitudinal axis of said handle by said person causes said stem to be received within said slot and the underside of said enlarged head portion to be engaged first by said first gently sloping portion and the continued application of said force in said longitudinal direction causing the lock button to be engaged by said more steeply sloping portion to vertically cam the lock button upwardly to unlock said door.

2. The apparatus as defined in claim 1, wherein the facing surfaces of the longitudinal slot are spaced apart about 0.34 inches.

* * * * *